(No Model.)

G. J. PILKINGTON.
APPARATUS FOR REFINING TALLOW AND OTHER LUBRICATING OILS.

No. 335,957. Patented Feb. 9, 1886.

WITNESSES:
Lewis Miller
J. E. Shaw

INVENTOR
Geo. J. Pilkington

UNITED STATES PATENT OFFICE.

GEORGE J. PILKINGTON, OF CHESTER, PENNSYLVANIA.

APPARATUS FOR REFINING TALLOW AND OTHER LUBRICATING OILS.

SPECIFICATION forming part of Letters Patent No. 335,957, dated February 9, 1886.

Application filed October 24, 1885. Serial No. 180,820. (No model.)

*To all whom it may concern:*

Be it known that I, GEORGE J. PILKINGTON, a citizen of the United States, residing at Chester, Delaware county, Pennsylvania, have invented a new and useful Improvement in Apparatus for Refining Tallow and other Lubricating Oils, of which invention the following is a specification.

My invention consists of a device for heating fatty matters—such as cylinder oils and tallow—whereby they are melted and at the same time separated from the gritty and other foreign substances usually mixed with them, preparatory to their use for lubricating cylinders, mills, and other machinery.

Figures 1, 2:
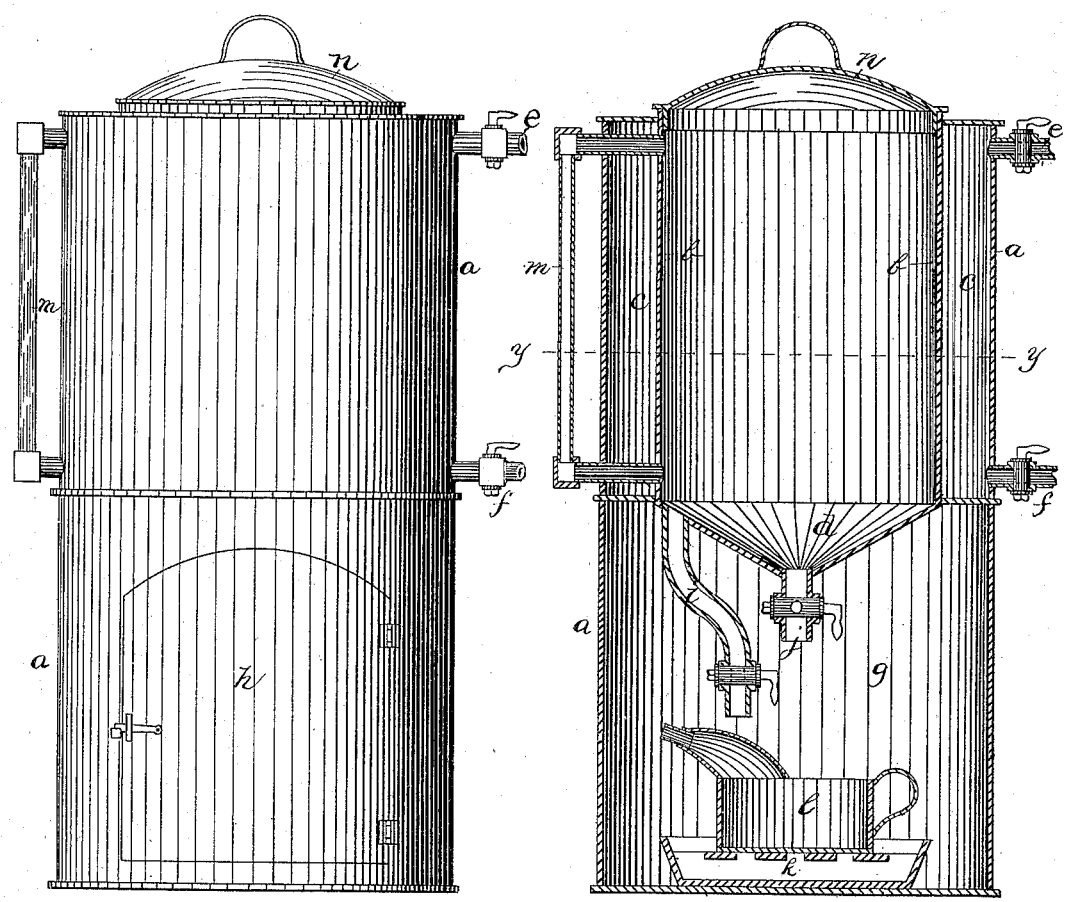
Figure 3:
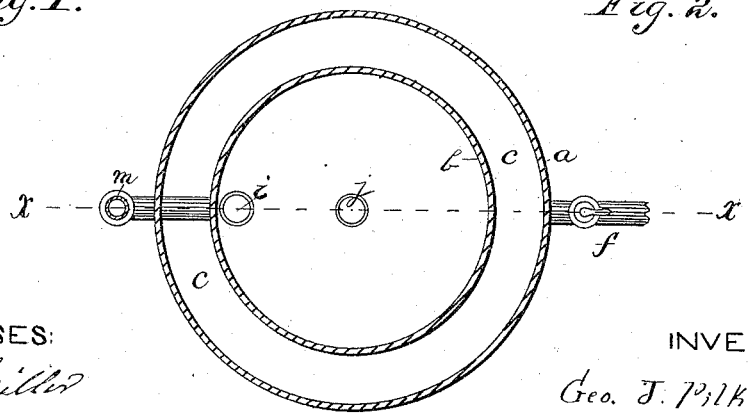

In the annexed drawings, Figure 1 is a front elevation of said oil-heater. Fig. 2 is a vertical cross-section of the same on the line $x\ x$ in Fig. 3. Fig. 3 is a horizontal cross-section of the same on the line $y\ y$ in Fig. 2.

$a$ is a metallic vessel of cylindrical or other convenient form.

$b$ is a like vessel, set within the vessel $a$ with a close space, $c$, between the two. The vessel $b$ is provided with a conical or depressed bottom, $d$.

$e$ is a pipe with cock for admitting steam into the space $c$.

$f$ is a pipe with cock for drawing off condensed steam.

$g$ is a chamber, closed by the door $h$.

$i$ is a pipe with cock for drawing off the heated oil.

$j$ is a pipe with cock for drawing off settlings.

$k$ is an ordinary drip tray.

$l$ is an oil-cup.

$m$ is a glass gage for indicating the height of the oil in the vessel $b$.

$n$ is the cover of vessel $b$.

The fatty matters to be heated are placed in the vessel $b$. Steam in quantity sufficient to melt the fat is then admitted through pipe $e$ into the space $c$. The gritty and other foreign matters contained in the oil and fat settle into the depression of bottom $d$, and are drawn off at will at pipe $j$, the clear heated oil or melted fat being drawn off through the pipe $i$ into the cup $l$.

Instead of depressing the bottom $d$, as above set forth, it might be made flat. In such case a pipe or tap for drawing off the sediment may be inserted at any place in the bottom within the chamber $g$ or through the side of vessel $b$ immediately above its bottom, and a pipe for drawing off the clear heated oil might be made to project up through the bottom to a point a little above the bottom, or the pipe last referred to might be inserted through the side of vessel $b$ a little above the bottom. In these several cases the heated oil could be drawn off clear of sediment.

When both the pipes for drawing off the sediment and the clear oil are attached to the side of vessel $b$, that portion of my device above described as chamber $g$ can be dispensed with. I prefer, however, to construct the device as first above set forth.

I claim—

1. A cylinder-oil heater consisting of an exterior vessel, $a$, an interior vessel, $b$, and an inclosed heating-space, $c$, with a pipe, $e$, for the admission of steam, and a pipe, $f$, for the escape of condensed steam, the vessel $b$ being provided with a depressed bottom, $d$, to receive grit and other settlings, and provided also with an aperture at or near the lowest part of said bottom $d$, for drawing off settlings, and with an aperture at or near the top level of said bottom for drawing off the clear heated oil, substantially as set forth.

2. An exterior vessel, $a$, an interior vessel, $b$, and an inclosed steam-space, $c$, an inlet-pipe, $e$, and an outlet-pipe, $f$, the vessel $b$ being provided with an aperture in or immediately above its bottom for drawing off sediment, and an aperture operative at a higher level for drawing clear heated oil, substantially as set forth.

GEO. J. PILKINGTON.

Witnesses:
J. E. SHAW,
C. E. LARZELERE.